United States Patent
Gissin et al.

(10) Patent No.: US 11,467,764 B2
(45) Date of Patent: Oct. 11, 2022

(54) NVME-BASED DATA READ METHOD, APPARATUS, AND SYSTEM

(71) Applicant: HUAWEI TECHNOLOGIES CO., LTD., Shenzhen (CN)

(72) Inventors: Victor Gissin, Hod Hasharon (IL); Junying Li, Shenzhen (CN); Guanfeng Zhou, Hangzhou (CN); Jiashu Lin, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/072,038

(22) Filed: Oct. 16, 2020

(65) Prior Publication Data

US 2021/0034284 A1 Feb. 4, 2021

Related U.S. Application Data

(63) Continuation of application No. PCT/CN2018/093918, filed on Jun. 30, 2018.

(51) Int. Cl.
*G06F 3/06* (2006.01)

(52) U.S. Cl.
CPC .......... *G06F 3/0655* (2013.01); *G06F 3/0604* (2013.01); *G06F 3/0679* (2013.01)

(58) Field of Classification Search
CPC ................. G06F 3/0659; G06F 3/0607; G06F 2213/0026
See application file for complete search history.

(56) References Cited

U.S. PATENT DOCUMENTS

| 10,503,434 B2 | 12/2019 | Mcglaughlin et al. |
| 2013/0086311 A1 | 4/2013 | Huang et al. |

(Continued)

FOREIGN PATENT DOCUMENTS

| CN | 103080917 A | 5/2013 |
| CN | 103970688 A | 8/2014 |

(Continued)

OTHER PUBLICATIONS

Marks, An NVM Express Tutorial, Flash Memory Summit, 2013 [retrieved from internet Oct. 21, 2021][<URL:https://www.flashmemorysummit.com/English/Collaterals/Proceedings/2013/20130812_PreConfD_Marks.pdf>] (Year: 2013).*

(Continued)

*Primary Examiner* — David Yi
*Assistant Examiner* — Nicholas A. Paperno
(74) *Attorney, Agent, or Firm* — Leydig, Voit & Mayer, Ltd.

(57) ABSTRACT

A non-volatile memory express (NVMe)-based data read method, apparatus, and system are provided. In various embodiments, a read instruction can be triggered by a host. The read instruction carries indication information of a first address opened by the host to an NVMe controller for addressing and accessing. In those embodiments, the host after obtaining the read instruction can send a data packet to the host. The data packet carries the first address and payload data. Still in those embodiments, the host can, after receiving the data packet, determine a second address based on the first address, and store the payload data into storage space indicated by the second address. The second address may be a private memory address of the host. Because a relationship between the second address and a communication protocol is broken, and the host may access the second address without being restricted by the communication protocol.

19 Claims, 9 Drawing Sheets

(56) References Cited

U.S. PATENT DOCUMENTS

| | | | |
|---|---|---|---|
| 2014/0195634 A1 | 7/2014 | Kishore et al. | |
| 2014/0281106 A1 | 9/2014 | Saghi et al. | |
| 2014/0325013 A1 | 10/2014 | Tamir et al. | |
| 2015/0261434 A1 | 9/2015 | Kagan et al. | |
| 2016/0124876 A1 | 5/2016 | Vucinic et al. | |
| 2016/0127468 A1 | 5/2016 | Malwankar et al. | |
| 2016/0127492 A1* | 5/2016 | Malwankar | G06F 3/0614 709/212 |
| 2016/0162189 A1 | 6/2016 | Malwankar | |
| 2017/0185316 A1 | 6/2017 | Nieuwejaar | |
| 2017/0286363 A1* | 10/2017 | Joshua | G06F 15/17331 |
| 2018/0074757 A1 | 3/2018 | Yamaguchi et al. | |
| 2018/0183901 A1* | 6/2018 | Lariviere | H04L 69/08 |
| 2018/0321945 A1* | 11/2018 | Benisty | G06F 13/385 |
| 2019/0303289 A1* | 10/2019 | Yoshii | G06F 12/0246 |

FOREIGN PATENT DOCUMENTS

| | | |
|---|---|---|
| CN | 106210041 A | 12/2016 |
| CN | 106484549 A | 3/2017 |
| CN | 107077426 A | 8/2017 |
| CN | 107209644 A | 9/2017 |
| CN | 107608909 A | 1/2018 |
| CN | 107832086 A | 3/2018 |
| CN | 107992436 A | 5/2018 |
| CN | 108089951 A | 5/2018 |
| EP | 3260971 A1 | 12/2017 |

OTHER PUBLICATIONS

Minturn et al., Under the Hood with NVMe over Fabrics, SNIA, 2015 [retrieved from internet Oct. 20, 2021][<URL:https://www.snia.org/sites/default/files/ESF/NVMe_Under_Hood_12_15_Final2.pdf>] (Year: 2015).*
NVM Express, Revision 1.3, May 1, 2017,total 282 pages.
Nvmexpress Workgroup: "NVM Express TM Revision 1.3c 1 NVM Express TM Base Specification",May 24, 2018, XP055800189,total 2 pages.

* cited by examiner

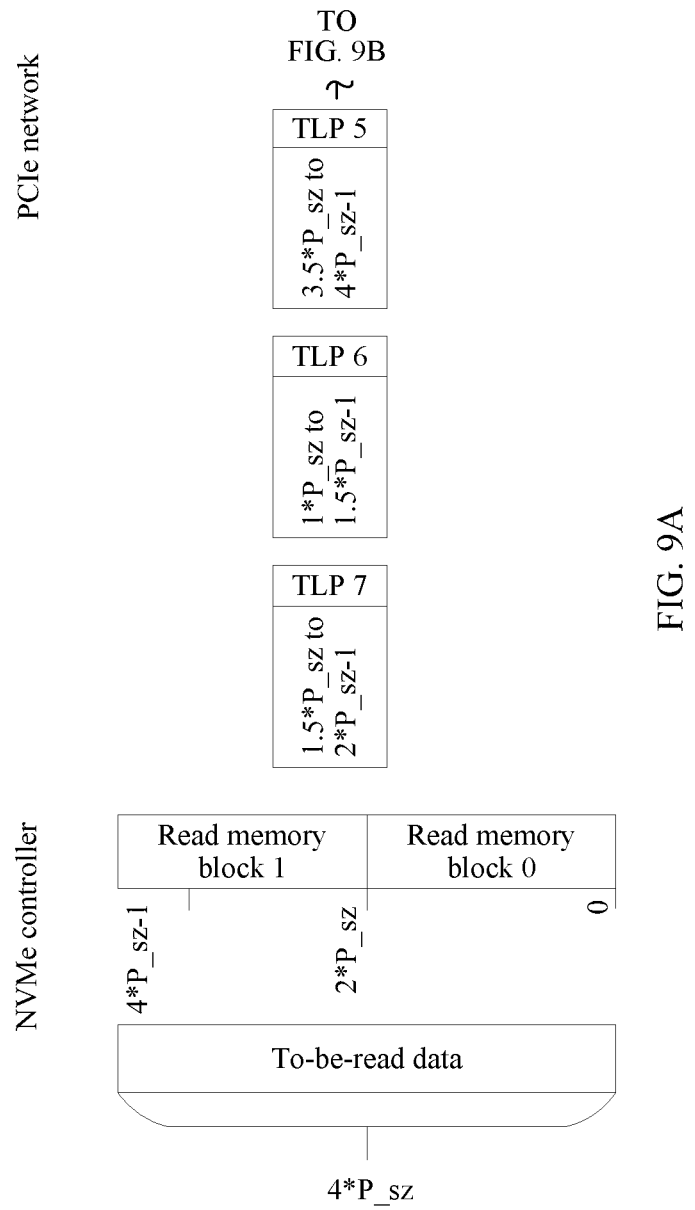

1200

NVME-BASED DATA READ METHOD, APPARATUS, AND SYSTEM

CROSS-REFERENCE TO RELATED APPLICATIONS

This application is a continuation of International Application No. PCT/CN2018/093918, filed on Jun. 30, 2018, the disclosure of which is hereby incorporated by reference in its entirety.

TECHNICAL FIELD

This application relates to the storage field, and in particular, to a non-volatile memory express (NVMe)-based data read method, apparatus, and system.

BACKGROUND

With development of storage technologies, especially in a solid state drive (SSD) using a Flash as a storage medium, standards for a serial advanced technology attachment (SATA) interface and a serial ATA advanced host controller interface/advanced host controller interface (AHCI) that are designed for a conventional mechanical hard disk drive cannot meet a requirement of a storage device, becoming a bottleneck to limit a processing capability of the storage device. In consequence, a non-volatile memory express (NVMe) emerges. The NVMe is an interface allowing communication between a host (Host) and a non-volatile memory (NVM) subsystem. The interface allowing the communication of the NVM subsystem (including a controller and a storage medium) is attached to a high-speed peripheral component interconnect express (PCIe) interface as a register interface, optimizing enterprise-grade and consumer-grade solid-state storage and providing advantages of high performance and a low access delay.

The NVMe is based on a pair of mechanisms: a submission queue (SQ) and a completion queue (CQ). The host places a command in the submission queue. The controller places completion information in a corresponding completion queue. Each submission queue entry (SQE) is a command. In a read instruction, a memory address used for data transmission is specified by using a metadata pointer (MPTR) and a data pointer (DPTR). After obtaining the read instruction, an NVMe controller writes, by performing a PCIe write operation, to-be-read data into storage space indicated by the memory address used for data transmission.

SUMMARY

Various embodiments provide an NVMe-based data read method, apparatus, and system. A host receives a data packet from an NVMe controller by using a portal address opened to the NVMe controller, and allocates a corresponding storage unit to the portal address in memory space of the host. After receiving the data packet, the host determines, based on the portal address carried in the data packet, an address of a storage unit corresponding to the portal address, and writes payload data in the data packet into the determined storage unit. In this way, a relationship between the storage unit and a communication protocol is broken. This implements a flexible data operation.

According to a first aspect, an NVMe-based data read system is provided, and the system includes a host, an NVMe controller, and a storage medium. The storage medium is configured to store data of the host; the host is configured to trigger a read instruction to the NVMe controller, where the read instruction carries indication information used to indicate a first address, and the first address is an address that is addressable by the NVMe controller; after obtaining the read instruction, the NVMe controller is configured to read, from the storage medium, to-be-read data corresponding to the read instruction, and send a first data packet to the host, where the first data packet carries the first address and first payload data, and the first payload data belongs to the first data packet; and after receiving the first data packet, the host is further configured to determine a second address based on the first address, and write the first payload data into a storage unit indicated by the second address, where the second address is an address that is addressable by the host.

The read instruction may further be an SQE. An example process of triggering the read instruction by the host may be that: The host writes the SQE into an SQ, and notifies the NVMe controller by using a doorbell mechanism. The first address is an address opened by the host to the NVMe controller for accessing. However, the first address is used only as a portal address of payload data that is written into the host by the NVMe controller, and storage space indicated by the first address does not actually store the payload data. After receiving a data packet from the NVMe controller, the host does not write the payload data into the storage space indicated by the first address, but allocates, in storage space that is addressable by the host, the second address corresponding to the first address, and writes the payload data into the storage unit indicated by the second address. Therefore, an operation of the host on the storage unit indicated by the second address is no longer restricted by a communication protocol between the host and the NVMe controller. In this application, a read operation delay can be shortened and storage space occupied by the host by the to-be-read data can be reduced.

According to the first aspect, in a first example implementation of the first aspect, after completing a write operation on the storage unit indicated by the second address, the host is further configured to perform an operation on data in the storage unit indicated by the second address. Completing the write operation on the storage unit is writing all data associated with the storage unit into the storage unit, for example, may be fully writing the storage unit or writing a last piece of payload data associated with the storage unit into the storage unit. Performing the operation on the data may be sending the data in the storage unit to another entity.

Storage space indicated by the second address may be a private memory of the host, is no longer accessed by the NVMe controller by using a PCIe address, and is not or is not used as a command memory buffer (CMB). After the host stores, based on a mapping relationship between the first address and the second address, the payload data into the storage unit indicated by the second address that is addressable by the host, a relationship between the second address and a communication protocol between the host and the NVMe controller is broken. After completing the write operation on the storage unit indicated by the second address, the host may perform the operation on the data in the storage unit indicated by the second address, and perform an operation on read data without a need to wait until a read operation indicated by the read instruction is totally completed.

According to the first example implementation of the first aspect, in a second example implementation of the first aspect, the NVMe controller is further configured to trigger a completion queue entry (CQE), where the CQE is used to indicate that the NVMe controller has completed a read operation specified by the read instruction. After performing the operation on the data in the storage unit indicated by the second address, the host is further configured to obtain the completion queue entry CQE.

That the NVMe controller triggers the CQE may further be that: After completing the read operation, the NVMe controller writes the CQE into a CQ, and notifies the host by using an interrupt mechanism. Based on an existing protocol, before triggering the read instruction, the host needs to allocate PCIe address space to the read instruction. Storage space indicated by the PCIe address is used to store the to-be-read data. Before completing the read instruction, the host loses ownership of the PCIe address space; in other words, before obtaining the CQE, the host cannot access the storage space indicated by the PCIe address, thereby causing a read operation delay and a waste of storage space. Because the second address is not the first address carried in the data packet but an internal address that is addressable by the host, the host may perform the operation on the data in the storage unit indicated by the second address before obtaining the CQE.

According to any one of the foregoing example implementations of the first aspect, in a third example implementation of the first aspect, after performing the operation on the data in the storage unit indicated by the second address, the host is further configured to release the storage unit indicated by the second address.

The host may organize internal storage space of the host into a memory pool. The memory pool includes a plurality of storage units. After completing an operation on data in a storage unit, the host may release the storage unit into the memory pool for the use of another read operation, and release the storage unit without a need to wait until an entire read operation is completed, thereby reducing occupation time of the storage unit and increasing utilization of the storage space.

According to any one of the first aspect or the foregoing example implementations of the first aspect, in a fourth example implementation of the first aspect, before triggering the read instruction, the host is further configured to allocate the storage unit indicated by the second address to the read instruction, and record a correspondence between the first address and the second address.

If the host allocates a corresponding storage unit to the read instruction before triggering a read instruction, storage space overflow can be effectively avoided. The host may trigger the read instruction based on a quantity of idle storage units in a maintained memory pool, to effectively adjust and control a read operation.

According to any one of the first aspect or the foregoing example implementations of the first aspect, in a fifth example implementation of the first aspect, the to-be-read data of the read instruction corresponds to at least two data packets, and the host allocates at least two storage units to the read instruction.

Because of a limitation on a size of payload data that can be carried in a data packet, when sending the to-be-read data, the NVMe controller may split the to-be-read data into a plurality of pieces and transmit the to-be-read data by using a plurality of data packets. The host may allocate a plurality of storage units of a corresponding quantity based on a scale of a read operation.

According to any one of the first aspect or the foregoing example implementations of the first aspect, in a sixth example implementation of the first aspect, the host is configured to determine the second address based on the first address and a sequence of the first payload data in the to-be-read data.

The host allocates a plurality of storage units to the read operation; in other words, the first address corresponds to the plurality of storage units. After receiving the first data packet, the host needs to determine a specific storage unit for the first payload data. The host may perform logical addressing on the plurality of storage units allocated to the read operation, and sequentially write the to-be-read data into the plurality of storage units. The host may further determine, based on the sequence of the first payload data in the to-be-read data, a storage unit into which the first payload data needs to be written.

According to any one of the first aspect or the foregoing example implementations of the first aspect, in a seventh example implementation of the first aspect, the NVMe controller is further configured to send a second data packet to the host, where the second data packet carries the first address and second payload data, and the to-be-read data includes the second payload data. The host is further configured to receive the second data packet, and determine a sequence of the first payload data and the second payload data in the to-be-read data based on a sequence of receiving the first data packet and the second data packet.

Because of a limitation on a size of payload data that can be carried in each data packet, the NVMe controller needs to split the to-be-read data into a plurality of data packets for transmission. After receiving the data packets, the host needs to re-sequence payload data carried in the data packets. If strict sequence-preserving is ensured when the NVMe controller sends the data packets in a sequence of the payload data in the to-be-read data, the host may sequence the payload data based on a sequence of receiving the data packets.

According to any one of the first aspect or the foregoing example implementations of the first aspect, in an eighth example implementation of the first aspect, the first data packet further carries an offset of the first payload data in the to-be-read data, and the offset is used to indicate the sequence of the first payload data in the to-be-read data.

A data packet carries an offset of payload data in the to-be-read data, so that the NVMe controller can implement out-of-sequence transmission of the data packet, to utilize a bandwidth resource to a greater extent.

According to any one of the first aspect or the foregoing example implementations of the first aspect, in an ninth example implementation of the first aspect, the first address is a PCIe address that is addressable by the NVMe controller, the first data packet is a PCIe packet, and the storage unit indicated by the second address is memory space of the host.

According to a second aspect, this application discloses an NVMe-based data read method. The method includes: triggering, by a host, a read instruction, where the read instruction carries indication information, the indication information is used to indicate a first address, and the first address is an address that is addressable by an NVMe controller; receiving, by the host, a first data packet from the NVMe controller, where the first data packet carries the first address and first payload data; determining, by the host, a second address based on the first address, where the second address is an address that is addressable by the host; and writing, by the host, the first payload data into a storage unit indicated by the second address.

According to the second aspect, in a first example implementation of the second aspect, after the host completes a write operation on the storage unit indicated by the second address, the method further includes: performing, by the host, an operation on data in the storage unit indicated by the second address.

According to the first example implementation of the second aspect, in a second example implementation of the second aspect, after the host performs the operation on the data in the storage unit indicated by the second address, the method further includes: obtaining, by the host, a completion queue entry CQE triggered by the NVMe controller, where the CQE is used to indicate that the NVMe controller has completed a read operation specified by the read instruction.

According to any one of the foregoing example implementations of the second aspect, in a third example implementation of the second aspect, after the host performs the operation on the data in the storage unit indicated by the second address, the method further includes: releasing, by the host, the storage unit indicated by the second address.

According to any one of the second aspect or the foregoing example implementations of the second aspect, in a fourth example implementation of the second aspect, before the triggering, by a host, a read instruction, the method further includes: allocating, by the host, the storage unit indicated by the second address to the read instruction, and recording a correspondence between the first address and the second address.

According to any one of the second aspect or the foregoing example implementations of the second aspect, in a fifth example implementation of the second aspect, to-be-read data of the read instruction corresponds to at least two data packets, and the host allocates at least two storage units to the read instruction.

According to any one of the second aspect or the foregoing example implementations of the second aspect, in a sixth example implementation of the second aspect, the host determines the second address based on the first address and a sequence of the first payload data in the to-be-read data.

According to any one of the second aspect or the foregoing example implementations of the second aspect, in a seventh example implementation of the second aspect, the method further includes: receiving, by the host, a second data packet from the NVMe controller, where the second data packet carries the first address and second payload data; and determining, by the host, a sequence of the first payload data and the second payload data in the to-be-read data based on a sequence of receiving the first data packet and the second data packet.

According to any one of the second aspect or the foregoing example implementations of the second aspect, in an eighth example implementation of the second aspect, the first data packet further carries an offset of the first payload data in the to-be-read data, and the offset is used to indicate the sequence of the first payload data in the to-be-read data.

According to any one of the second aspect or the foregoing example implementations of the second aspect, in an eighth example implementation of the second aspect, the first address is a PCIe address that is addressable by the NVMe controller, the first data packet is a PCIe packet, and the storage unit indicated by the second address is memory space of the host.

The second aspect is a method implementation corresponding to the first aspect, and the description in any one of the first aspect or the example implementations of the first aspect is correspondingly applicable to any one of the second aspect or the example implementations of the second aspect. Details are not described herein again.

According to a third aspect, this application provides a readable medium that includes an executable instruction. When a processor of a computing device executes the executable instruction, the computing device performs the method according to any one of the second aspect or the example implementations of the second aspect.

According to a fourth aspect, this application provides a computing device, including a processor, a memory, and a bus. The memory is configured to store an executable instruction, and the processor is coupled to the memory through the bus. When the computing device runs, the processor executes the executable instruction stored in the memory, and the computing device is enabled to perform the method according to any one of the second aspect or the example implementations of the second aspect.

According to a fifth aspect, this application discloses an NVMe-based data read apparatus, and the apparatus includes: a processing unit, configured to trigger a read instruction, where the read instruction carries indication information, the indication information is used to indicate a first address, and the first address is an address that is addressable by an NVMe controller; and a receiving unit, configured to receive a first data packet from the NVMe controller, where the first data packet carries the first address and first payload data. The processing unit is further configured to determine a second address based on the first address, and write the first payload data into a storage unit indicated by the second address, where the second address is an address that is addressable by the processing unit.

According to the fifth aspect, in a first example implementation of the fifth aspect, after completing a write operation on the storage unit indicated by the second address, the processing unit is further configured to perform an operation on data in the storage unit indicated by the second address.

According to the first example implementation of the fifth aspect, in a second example implementation of the fifth aspect, after performing the operation on the data in the storage unit indicated by the second address, the processing unit is further configured to obtain a completion queue entry CQE triggered by the NVMe controller, where the CQE is used to indicate that the NVMe controller has completed a read operation specified by the read instruction.

According to any one of the foregoing example implementations of the fifth aspect, in a third example implementation of the fifth aspect, after performing the operation on the data in the storage unit indicated by the second address, the processing unit is further configured to release the storage unit indicated by the second address.

According to any one of the fifth aspect or the foregoing example implementations of the fifth aspect, in a fourth example implementation of the fifth aspect, before triggering the read instruction, the processing unit is further configured to allocate the storage unit indicated by the second address to the read instruction, and record a correspondence between the first address and the second address.

According to any one of the fifth aspect or the foregoing example implementations of the fifth aspect, in a fifth example implementation of the fifth aspect, to-be-read data of the read instruction corresponds to at least two data packets, and the processing unit allocates at least two storage units to the read instruction.

According to any one of the fifth aspect or the foregoing example implementations of the fifth aspect, in a sixth example implementation of the fifth aspect, the processing unit is configured to determine the second address based on the first address and a sequence of the first payload data in the to-be-read data.

According to any one of the fifth aspect or the foregoing example implementations of the fifth aspect, in a seventh example implementation of the fifth aspect, the receiving unit is further configured to receive a second data packet from the NVMe controller, where the second data packet carries the first address and second payload data; and the processing unit is further configured to determine a sequence of the first payload data and the second payload data in the to-be-read data based on a sequence of receiving the first data packet and the second data packet.

According to any one of the fifth aspect or the foregoing example implementations of the fifth aspect, in an eighth example implementation of the fifth aspect, the first data packet further carries an offset of the first payload data in the to-be-read data, and the offset is used to indicate the sequence of the first payload data in the to-be-read data.

According to any one of the fifth aspect or the foregoing example implementations of the fifth aspect, the first address is a PCIe address that is addressable by the NVMe controller, the first data packet is a PCIe packet, and the storage unit indicated by the second address is memory space of the apparatus.

The fifth aspect is an apparatus implementation corresponding to the first aspect, and the description in any one of the first aspect or the example implementations of the first aspect is correspondingly applicable to any one of the fifth aspect or the example implementations of the fifth aspect. Details are not described herein again.

According to the technical solutions disclosed in this application, the host opens the first address to the NVMe controller as a data portal address, so that the NVMe controller writes the to-be-read data into the host by using the first address. A destination address carried in a data packet from the NVMe controller is the first address. After receiving the data packet, the host does not truly write payload data in the data packet into the storage space indicated by the first address, but maps the first address to the second address, and writes the payload data in the data packet into the storage space indicated by the second address. The storage space indicated by the second address may be private memory space of the host, so that a relationship between the storage space for storing the payload data and a communication protocol is broken, and the host accesses the second address without being restricted by the communication protocol. Before the read instruction is completed, the host may use data stored in the storage space indicated by the second address, and early release the storage space indicated by the second address for the use of another read operation. According to the technical solutions disclosed in this application, a read operation delay can be shortened and storage space used to store the to-be-read data can be reduced.

BRIEF DESCRIPTION OF DRAWINGS

FIG. 9A and FIG. 9B are a schematic diagram of data packet transmission according to an embodiment of the present disclosure;

DESCRIPTION OF EMBODIMENTS

Figure 1:
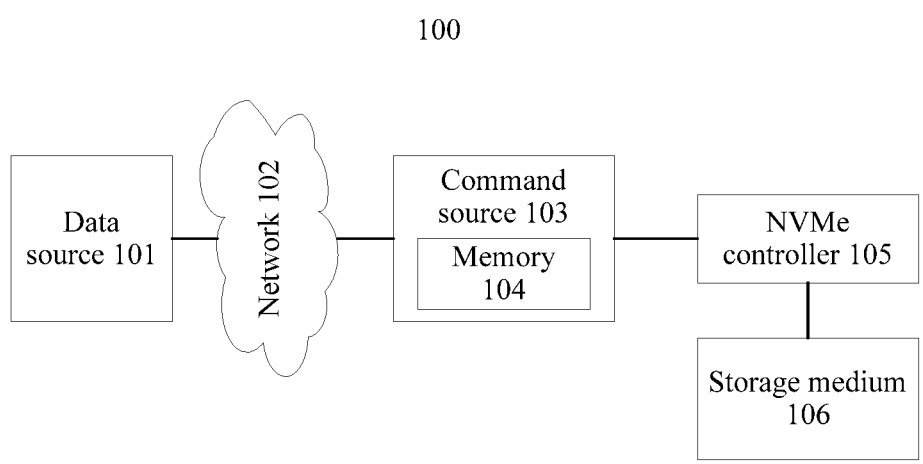
FIG. 1 is a schematic diagram of a logical structure of an NVMe system according to an embodiment of this application.

The following describes the embodiments of the present disclosure with reference to the accompanying drawings.

In the embodiments of the present disclosure, terms such as "first" and "second" are used to distinguish between objects, such as a first address and a second address, but there is no logical or time-sequential dependency between the "first" and the "second".

In the embodiments of the present disclosure, a "data packet" is a data packet that is from an NVMe controller to a host and that carries payload data. The payload data herein may be user data or metadata of user data, and a type of the payload data is not limited in the embodiments in accordance with the present disclosure. In the following description, unless otherwise stated, in the embodiments of the present disclosure, a word "data" or a phrase "payload data" is used to represent various types of data carried in a data packet. In the embodiments of the present disclosure, the data packet may be a PCIe packet.

In the embodiments in accordance the present disclosure, a portal is address space opened by the host to the NVMe controller, a portal address may be further a PCIe address, and the data packet may be a PCIe write packet. The NVMe controller sends a data packet to the host through the portal, where the data packet carries the portal address. After receiving the data packet, the host identifies the portal address, allocates corresponding storage space to the portal in a local internal memory, and writes payload data carried in the data packet into the allocated storage space for caching, instead of writing the payload data into storage space indicated by the portal address. The internal memory may be further private memory space of the host.

In various embodiments in accordance with present disclosure, a read operation may be any operation, in an NVMe command set, of reading data from the NVMe controller by the host. An instruction for indicating the read operation is a read instruction. A specific implementation of the read instruction may be a submission queue entry.

In various embodiments in accordance with the present disclosure, a command initiator and a data initiator may be a same entity or separate bodies. The command initiator is a system entity directly triggering an instruction to the NVMe controller, and is also referred to as a command source in the embodiments of the present disclosure. The data initiator is a system entity that requires to read data and consume the data, that is, a system entity used to initiate a data access request, and is also referred to as a data source in the embodiments of the present disclosure. In a scenario in which the command source and the data source are separate, the data source is required to read data by using the command source. In the embodiments of the present disclosure, the word "host" may refer to the command source in a scenario in which the data source and the command source are separate, or may refer to a computing device communicating with the NVMe controller in a scenario in which the data source and the command source are not separate.

In a conventional manner, when the host performs an NVMe read operation, address information of storage space used to store to-be-read data is carried in a triggered SQE by using a DPTR or an MPTR, and the NVMe controller writes, based on the SQE, the to-be-read data into the storage space indicated by the address information. In a time period from submitting the SQE by the host to obtaining, by the host, a completion queue entry used by the NVMe controller to indicate that a read operation is completed, the host loses ownership of the storage space used to store the to-be-read data. In other words, the host needs to wait until the read operation is totally completed, and then can access data stored in the storage space.

FIG. 1 is an architectural diagram of an NVMe system 100 according to an embodiment. As shown in FIG. 1, a data source 101 and a command source 103 in the system 100 are not a same entity, but are separate and are interconnected through a network 102. The command source 103 may be coupled to an NVMe controller 105 through a PCIe bus, and the NVMe controller 105 is coupled to a storage medium 106.

In this embodiment, the storage medium 106 is usually also referred to as an external memory, is generally a non-volatile storage medium, and may be configured to store data permanently. The storage medium 106 may be a magnetic medium (for example, a floppy disk, a hard disk, or a magnetic tape), an optical medium (for example, a compact disc), a semiconductor medium (for example, a flash (Flash) memory), or the like. Implementation forms of the storage medium 106 are not limited by this embodiment. In some embodiments, the storage medium 106 may further include a remote memory separated from the NVMe controller 105, for example, a network storage medium coupled to the NVMe controller 105 through a network.

In this embodiment, the network 102 may be used to indicate any interconnection manner or interconnection protocol, or the like between the data source 101 and the command source 103, for example, may be the PCIe bus, an internal interconnection bus of a computer device, the Internet, an intranet, a local area network (LAN), a wide area network (WAN), or a storage area network (SAN), or any combination of the foregoing networks.

In the system 100, the data source 101 needs to communicate with the NVMe controller 105 by using the command source 103. In a conventional manner, a read instruction triggered by the command source 103 needs to carry address information of storage space used to store to-be-read data. When a read operation is performed, the to-be-read data first needs to be totally transferred from the storage medium 106 controlled by the NVMe controller 105 to the command source 103. After obtaining a CQE indicating that the read operation is completed, the command source 103 may send data to the data source 101.

Figure 2:
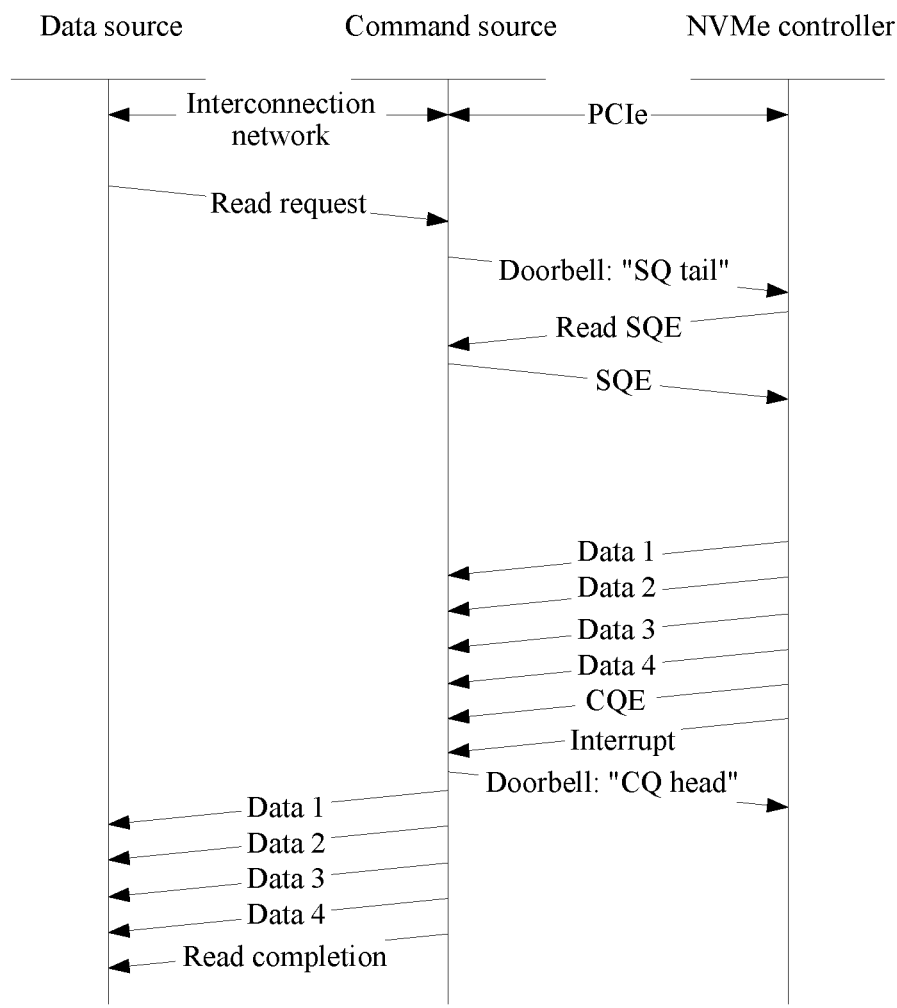
FIG. 2 is a signaling diagram of an NVMe standard-based data read method.

Further, as shown in FIG. 2, based on a conventional manner, when a data source needs to read data from a storage medium, the data source first sends a read request to a command source. The command source writes an SQE into a submission queue (SQ) based on the read request received from the data source, and carries, by using a DPTR field or an MPTR field of the SQE, address information used to receive to-be-read data. The command source then notifies, by using a doorbell mechanism, an NVMe controller that there is a new SQE. After receiving a doorbell, the NVMe controller reads the SQE from the SQ, and totally writes, by using a PCIe write instruction based on the address information carried in the SQE, the to-be-read data into storage space indicated by the address information. After a read operation is completed, the NVMe controller writes a CQE into a completion queue (CQ), and notifies the command source by using an interrupt mechanism. The command source processes an interrupt signal to obtain the CQE, and sends the to-be-read data to the data source.

It can be learned from FIG. 2 that, before initiating a read instruction, the command source needs to reserve storage space used to receive the to-be-read data, and loses ownership of this part of the storage space before obtaining the CQE. In other words, the command source needs to wait until the to-be-read data is totally written into the storage space, and then can send data to the data source. A delay of this process is directly proportional to a size of the to-be-read data. In addition, the command source requires a large amount of memory space that is addressable by the NVMe controller to store the to-be-read data, and this part of the memory space is always occupied in a time period from allocating a memory to the to-be-read data by the command source to obtaining, by the command source, the memory released by an NVMe controller.

Figure 3:
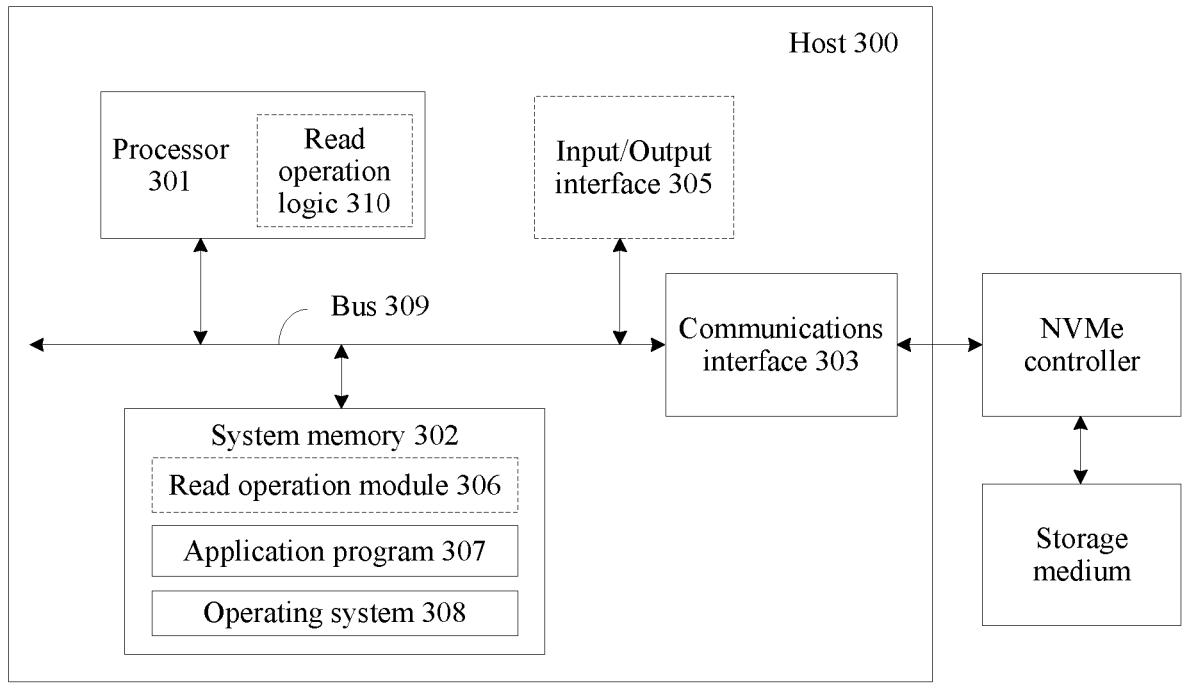
FIG. 3 is a schematic diagram of a hardware structure of a host according to an embodiment of this application.

FIG. 3 is a schematic structural diagram of a host 300 according to one embodiment.

As shown in FIG. 3, the host 300 includes a processor 301. The processor 301 is coupled to a system memory 302. The processor 301 may be a computing logic, such as a central processing unit (CPU), a graphics processing unit (GPU), a field programmable gate array (FPGA), an application-specific integrated circuit (ASIC), or a digital signal processor (DSP), or any combination of the foregoing computing logics. The processor 301 may be a single-core processor or a multi-core processor.

In this embodiment, the processor 301 may further include a register. Address information of the register may be opened to an NVMe controller as a PCIe address.

In one embodiment, the processor 301 may further include a read operation logic 310, and the read operation logic 310 may be a specific hardware circuit or a firmware module integrated in the processor 301. If the read operation logic 310 is a specific hardware circuit, the read operation logic 310 performs the method in the embodiments of this application. If the read operation logic 310 is a firmware module, the processor 301 executes firmware code in the read operation logic 310 to implement the technical solutions in various embodiments. The read operation logic 310 includes: (1) a logic (a circuit/firmware code) configured to trigger a read instruction, where the read instruction carries indication information, and the indication information is used to indicate a first address that is addressable by the NVMe controller; (2) a logic (a circuit/firmware code)

configured to receive a data packet from the NVMe controller, where the data packet carries the first address and payload data; (3) a logic (a circuit/firmware code) configured to determine, based on the first address, a second address that is addressable by the host 300; and (4) a logic (a circuit/firmware code) configured to write the payload data into a storage unit indicated by the second address.

A bus 309 is configured to transmit information between components of the host 300, and may use a wired connection manner or a wireless connection manner. This is not limited in this application. The bus 309 is further coupled to an input/output interface 305 and a communications interface 303.

The input/output interface 305 is coupled to an input/output device, and is configured to receive input information and output an operation result. The input/output device may be a mouse, a keyboard, a display, a CD-ROM drive, or the like.

The communications interface 303 is configured to implement communication with another device or network, and may be coupled to the another device or network wiredly or wirelessly. For example, the host 300 may be coupled to the NVMe controller through the communications interface 303. The host 300 may be further coupled to a network through the communications interface 303, and be coupled to the NVMe controller through the network.

Some features of various embodiments may be implemented/supported by the processor 301 by executing software code in the system memory 302. The system memory 302 may include some software, for example, an operating system 308 (for example, Darwin, RTXC, Linux, Unix, OS X, Windows, mac OS, or an embedded operating system (for example, Vxworks)), an application program 307, and a read operation module 306.

In one embodiment, the processor 301 executes the read operation module 306 to implement the technical solutions in the embodiments of this application. The read operation module 306 includes: (1) code used to trigger the read instruction, where the read instruction carries the indication information, and the indication information is used to indicate the first address that is addressable by the NVMe controller; (2) code used to receive the data packet from the NVMe controller, where the data packet carries the first address and the payload data; (3) code used to determine, based on the first address, the second address that is addressable by the host 300; and (4) code used to write the payload data into the storage unit indicated by the second address.

In addition, FIG. 3 shows merely an example of the host 300. The host 300 may include more or fewer components than those shown in FIG. 3, or may have different component configurations. In addition, various components shown in FIG. 3 may be implemented by hardware, software, or a combination of hardware and software.

Figure 4:
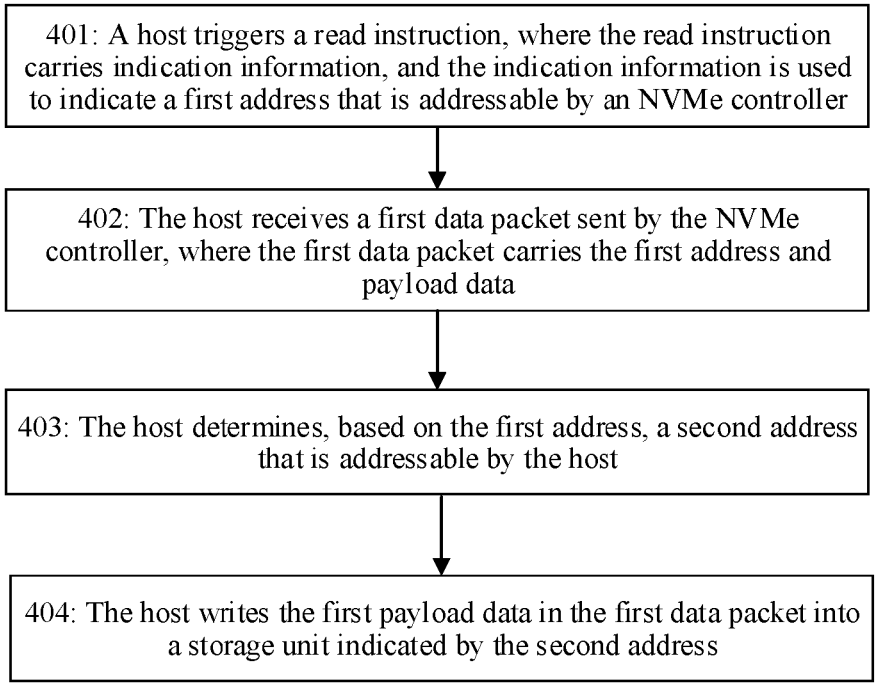
FIG. 4 is a schematic flowchart of an NVMe-based data read method according to an embodiment of this application.

To shorten a read instruction delay and reduce memory space occupied by a read operation, an embodiment of the present disclosure provides an NVMe-based data read method. As shown in FIG. 4, the method 400 includes the following steps.

Step 401: A host triggers a read instruction, where the read instruction carries indication information, and the indication information is used to indicate a first address that is addressable by an NVMe controller.

In this embodiment of the present disclosure, the read instruction may be further an SQE. In the following description, an SQE is used as an example of the read instruction for description. However, it should be understood that implementation form of a first read instruction is not limited.

For a process of triggering the read instruction by the host to the NVMe controller, refer to an NVMe standard. Further, the host writes the SQE into an SQ, and notifies, by using a doorbell mechanism, the NVMe controller that there is a new SQE. The NVMe controller obtains the SQE from the SQ based on the doorbell mechanism. In this embodiment, the host may further directly push the SQE to the NVMe controller. Triggering the read instruction by the host to the NVMe controller is not limited.

In this embodiment, the host may open a part of storage space of the host to the NVMe controller. Further, the host may open the part of the storage space of the host to the NVMe controller as PCIe storage space, and the NVMe controller may access the part of the storage space based on a PCIe address. A base address register (BAR) is used as an example for description. The host opens the BAR to the NVMe controller as the PCIe storage space, and organizes a part of the PCIe address of the BAR into a plurality of portals (portal). Each portal occupies specific PCIe address space that is addressable by the NVMe controller, and a portal address may be an initial PCIe address of the portal. The indication information carried in the read instruction triggered by the host may be used to indicate a portal, and the first address may be a portal address or some fields of the portal address. The portal is a data portal through which the NVMe controller performs a PCIe write operation on the host. In the following description, a function of the portal is described in more detail. A manner of organizing a portal in the PCIe address space is not limited in the present disclosure, provided that each portal uniquely corresponds to a specific read operation.

Figure 5:
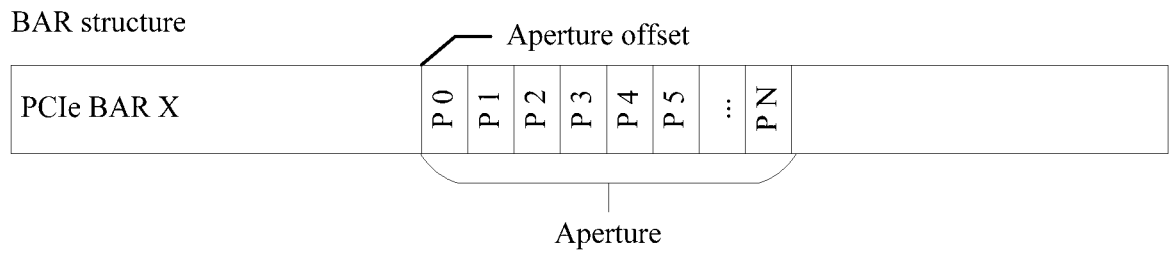
FIG. 5 is a schematic diagram of an organizational structure of a portal according to an embodiment of the present disclosure.

In this embodiment, the host may organize the part of the PCIe address of the base address register of the host into an aperture, and each aperture includes a plurality of portals (portal). For example, the portals may be organized in a form of an array, and the portals are addressed based on an array base address plus a portal offset. The array is referred to as an aperture. FIG. 5 is a schematic structural diagram of a base address register. Each aperture includes a group of portals P 0 to P N, and each portal is uniquely associated with a specific read operation. "Unique" means that the host can initiate only one NVMe read operation to be associated with one specific portal at any time.

Figure 6:
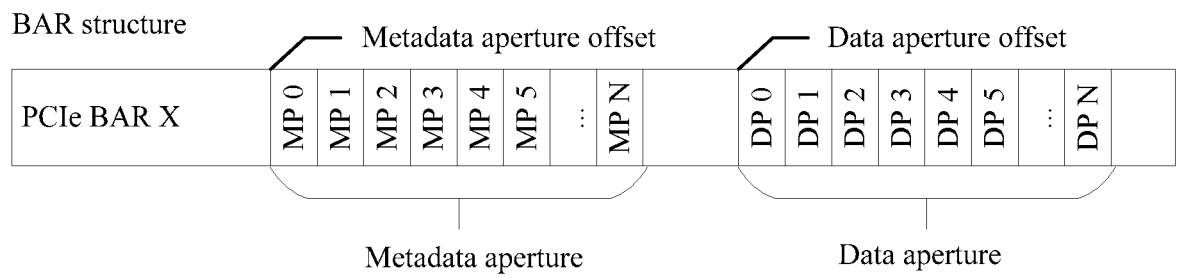
FIG. 6 is a schematic diagram of an organizational structure of a portal according to an embodiment of the present disclosure.

Further, as shown in FIG. 6, in this embodiment, the aperture may be classified into a metadata aperture and a data aperture. The NVMe controller writes data into the host by performing the PCIe write operation through portals DP 0 to DP N included in the data aperture, and writes metadata into the host through portals MP 0 to MP N included in the metadata aperture. For ease of description, in the following description, unless otherwise stated, the metadata and the data are collectively referred to as data in the embodiments of the present disclosure.

Figure 7:
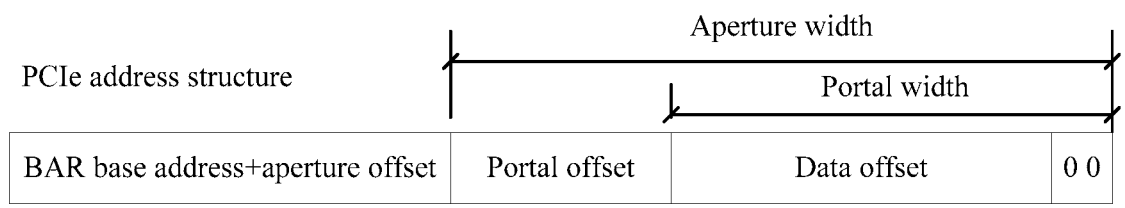
FIG. 7 is a schematic diagram of a PCIe address structure according to an embodiment of the present disclosure.

FIG. 7 shows a PCIe address structure in a PCIe data packet according to an embodiment of the present disclosure. As shown in FIG. 7, the PCIe address structure includes a BAR base address, an aperture offset, and a portal offset. The BAR and the aperture offset are used to uniquely determine an aperture, and the portal offset is used to indicate a specific portal in the aperture.

In this embodiment, portals may be further randomly distributed in PCIe address space, and the portals randomly distributed in the PCIe space are referred to as any "data portal" and "metadata portal".

In this embodiment, indication information is configured to indicate a specific portal, and an NVMe controller may uniquely determine a portal based on the indication information. A specific form of the indication information is not limited in the present disclosure.

In this embodiment, the indication information may be an explicit address, and the indication information may be a specific PCIe address of a portal or some fields of a portal address; to be specific, the indication information may be a first address or some fields of the first address. For example, if a portal is organized into an array, the indication information may be a portal offset of the portal, and a BAR base address and an aperture offset may be used as configuration information of a host for the NVMe controller to obtain. The NVMe controller may determine a full PCIe address of the portal based on the indication information. In this case, a format of an SQE may be consistent with that specified in an NVMe standard.

In this embodiment, the indication information may alternatively be an implicit address. For example, if each SQE in an SQ has a unique command identifier CID, the indication information may include a "queue ID+CID". If the CID of each SQE processed by the NVMe controller is unique, the indication information may be a CID carried in a corresponding SQE. In another implementation, the indication information may alternatively be a part of the CID. In this embodiment, the indication information may alternatively be specified by using another field in a specially defined MPTR, PRT, or SQE. An implementation of the indication information is not limited. The NVMe controller may maintain a mapping relationship between indication information and a portal address, and uniquely determine a portal address based on the mapping relationship and the indication information. For example, an indication identifier is a CID of an SQE, and a coding manner of a system CID is the same as an addressing manner of a portal offset. The CID is in a one-to-one correspondence with the portal offset. The BAR base address and the aperture offset may be used as the configuration information of the host for the NVMe controller to obtain, and the NVMe controller may determine a first address of a data packet based on the mapping relationship between the indication information and the portal address.

An implementation of the indication information is not limited, provided that the NVMe controller can determine the first address based on the indication information. The first address is used to indicate a portal corresponding to a read operation, and is further a portal address or some fields of a portal address.

Step 402: The host receives a first data packet from the NVMe controller, where the first data packet carries the first address and first payload data.

In this embodiment, the data packet may be a PCIe write operation packet. More further, the data packet may be a transaction layer packet (TLP), the payload data may be payload (payload) carried in the TLP, and the first address may be a PCIe address in the TLP or a part of a PCIe address in the TLP.

The NVMe controller maintains the mapping relationship between the indication information and the first address. The first address may be further a portal address corresponding to the read operation. After obtaining the read instruction, the NVMe controller determines the first address based on a specific implementation of the indication information, reads data from a storage medium based on the read instruction, encapsulates the TLP based on the first address and the read data, and sends the TLP to the host.

Step 403: The host determines, based on the first address, a second address that is addressable by the host.

The first address is used to indicate a portal of the PCIe write operation. The NVMe controller writes data of the read operation into the host through the portal. The "portal" represents a range in PCIe address space of the host. After receiving, from the portal, the data packet from the NVMe controller, the host parses the data packet to obtain the first address. However, the host does not use storage space indicated by the first address to store the payload data, but determines, in an internal memory of the host based on the first address and a preset correspondence, a second address of a storage unit used to actually store the payload data.

The storage unit indicated by the second address may be internal memory space of the host, and is not presented by using the PCIe address. In other words, the internal memory used by the host to store the payload data may no longer be accessed by the host in a PCIe addressing manner, and is not or is not used as a command memory buffer (CMB). The storage unit indicated by the second address may serve as a read buffer for data.

The first address is used to indicate a specific "portal". After receiving a data packet from the portal, the host maps the first address to the second address. Further, the host may map the first address to the second address by using a memory mapping table MTT. The host may maintain one MTT entry for each portal, and each entry may associate a portal with a corresponding storage unit. The storage unit may be fixed-size storage space. In the following description, the storage unit is also referred to as a read page. Before triggering the read instruction, the host allocates the storage unit indicated by the second address to the read instruction, and records a correspondence between the first address and the second address by using the MTT entry.

In this embodiment, the portal is in a one-to-one correspondence with the read operation. In one read operation, based on a size of to-be-read data, the to-be-read data of the read instruction may correspond to at least two data packets, and the host may also allocate at least two storage units to the read instruction.

A size of the read page is not limited, but it is recommended that a read memory block of the NVMe controller includes an integer quantity of read pages. After reading the data from the storage medium, the NVMe controller places the data in an error correction buffer for checking and error correction, and then writes data obtained after the error correction into a "portal". The error correction buffer is also referred to as a read memory block.

Figure 8A:
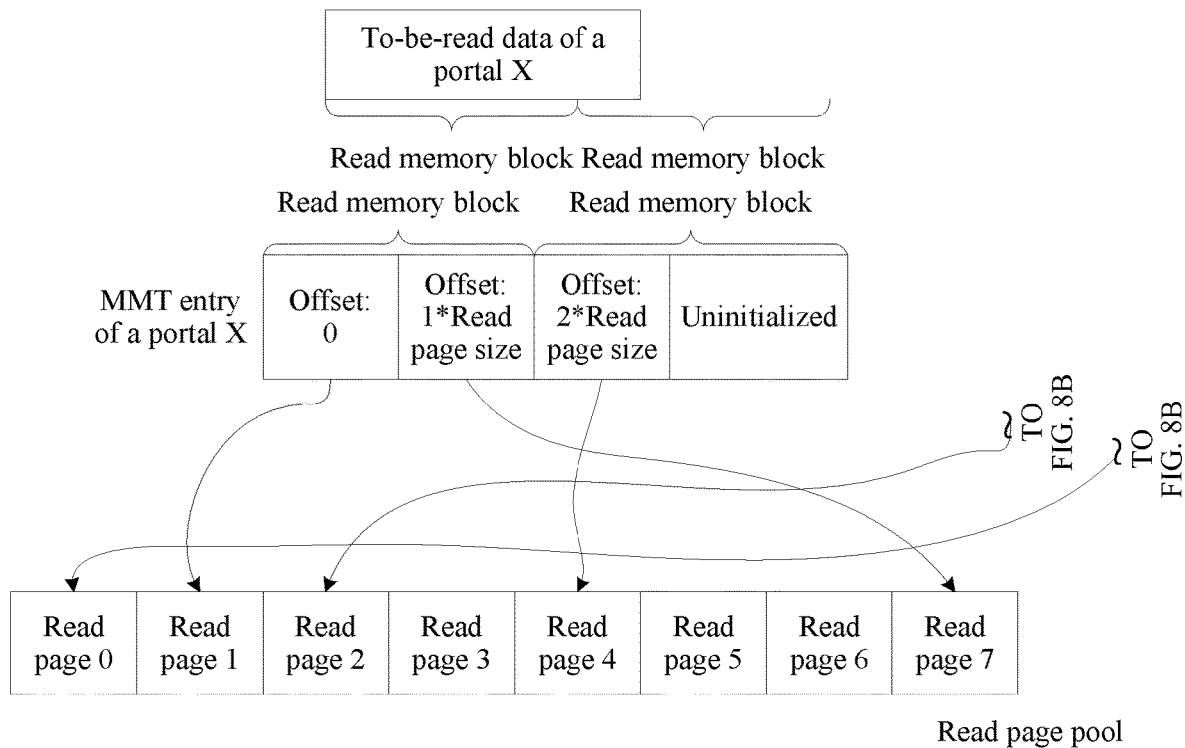
FIG. 8A and FIG. 8B are a schematic diagram of an address mapping relationship according to an embodiment of the present disclosure.
Figure 8B:
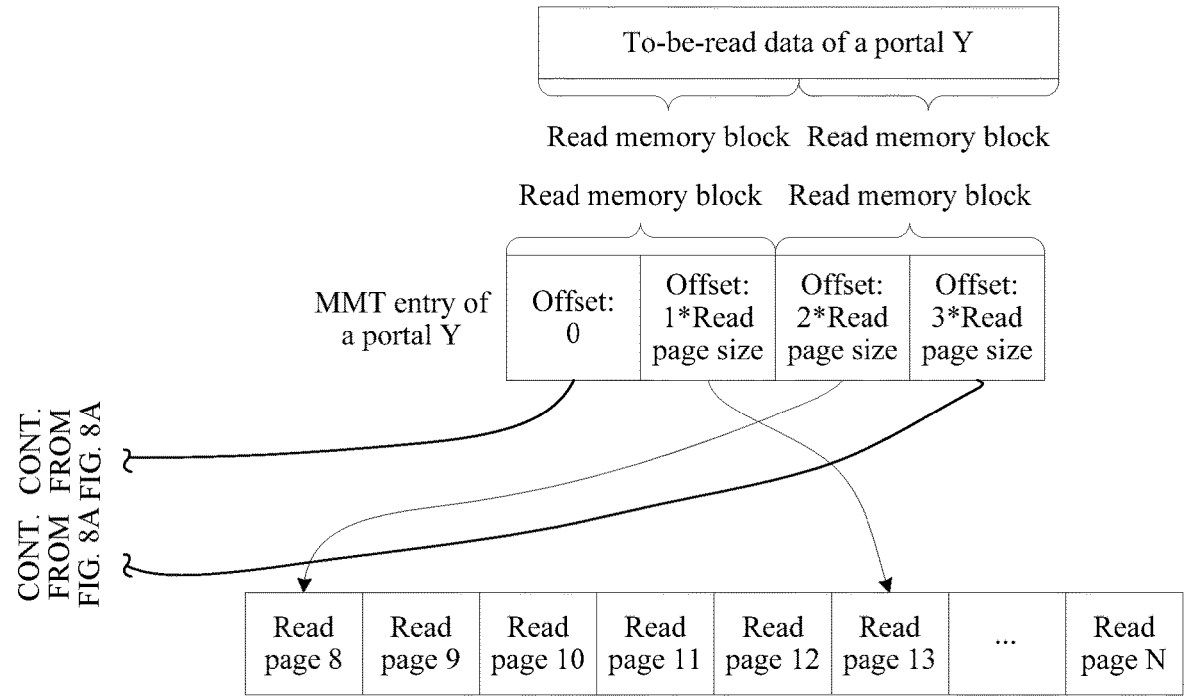

In various embodiments in accordance with the present disclosure, the host may organize a memory of the host into a read page pool. Before initiating a read operation, the host allocates a quantity of read pages, required by the read operation, in the read page pool, and initializes an MTT entry of a portal corresponding to the read operation. The MTT entry records a correspondence between a portal address and a read page address. FIG. 8A and FIG. 8B are a schematic diagram of an MTT entry according to an embodiment of the present disclosure. The MTT entry records a correspondence between a portal and a read page. As shown in the figure, read pages corresponding to a portal X are a read page 1, a read page 7, and a read page 4. Read pages corresponding to a portal Y are a read page 2, a read page 13, a read page 8, and a read page 0.

In this embodiment, the read page is fixed-size storage space. A size of the read page may be less than a size of to-be-read data. Therefore, a read operation may require more than one read page. During allocation, a host may allocate at least two read pages to a read instruction. If the host may allocate a plurality of read pages to the read operation, a second address points to one of the read pages. The host may determine the second address based on a first address and a sequence of payload data in the to-be-read data.

A manner of determining the sequence of the payload data in the to-be-read data by the host is not limited in this embodiment of the present disclosure. If sequence-preserving is ensured when an NVMe controller performs a PCIe write operation, the host may determine the sequence of the payload data in the to-be-read data based on a sequence of receiving a data packet. For example, the NVMe controller further sends a second data packet to the host, where the second data packet carries the first address and second payload data, and the second payload data also belongs to the to-be-read data. After receiving the second data packet, the host may determine a sequence of first payload data and the second payload data in the to-be-read data based on a sequence of receiving first data packet and the second data packet. If sequence-preserving is not ensured when the NVMe controller performs the PCIe write operation, a data packet may further carry an offset of the payload data in the to-be-read data, and the offset is used to indicate a sequence of the payload data in the to-be-read data.

In this embodiment, the NVMe controller may send a data packet in a sequence-preserving manner or a non-sequence-preserving manner. For example, the NVMe controller may support either or both of the following two sequential modes.

"Strict" mode:

In this mode, the NVMe controller sends data packets in a monotonically increasing sequence of data offsets. The host receives payload data based on a sequence of the data packets. In this mode, no offset is required. To be specific, a portal width shown in FIG. 7 may be only two bits (specified in a standard).

"Easing" mode:

In the easing mode, the NVMe controller may send a PCIe write transaction in any sequence, but a data packet needs to carry a data offset. In this embodiment of the present disclosure, the NVMe controller may concurrently process logical blocks of the read operation. For example, the NVMe controller may read data corresponding to different logical blocks from a storage medium, and respectively place the data in different read memory blocks for checking. Because the different read memory blocks complete checking at different times, the read memory blocks may not be written into the host strictly according to a sequence of logical blocks, and a read memory block corresponding to a first logical block may be written into a target memory later than a read memory block corresponding to a last logical block. The NVMe controller reorganizes data based on a data offset carried in a transaction packet. In this mode, the data packet needs to carry the data offset. In other words, the portal width shown in FIG. 7 needs to be greater than or equal to a maximum data transmission size.

Step 404: The host writes the first payload data in the first data packet into the storage unit indicated by the second address.

After receiving the data packet from the NVMe controller, the host determines the second address based on the first address, and then writes the payload data into the storage unit indicated by the second address.

In this embodiment, after completing a write operation on the storage unit indicated by the second address, the host may perform an operation on data in the storage unit indicated by the second address; in other words, the host may consume the data, for example, may send the data to another entity. In this embodiment, after data related to a read page is totally written into the read page, the host completes the write operation on the read page. In other words, after data in a last TLP related to the read page is written into the read page, the host completes the write operation on the read page.

In this embodiment, one read operation may have a plurality of read pages. Before completing the entire read operation, the host may complete write operations on some read pages. After completing a write operation on one read page, the host may use data in the read page, without a need to wait until the entire read operation is completed.

Figure 9B:
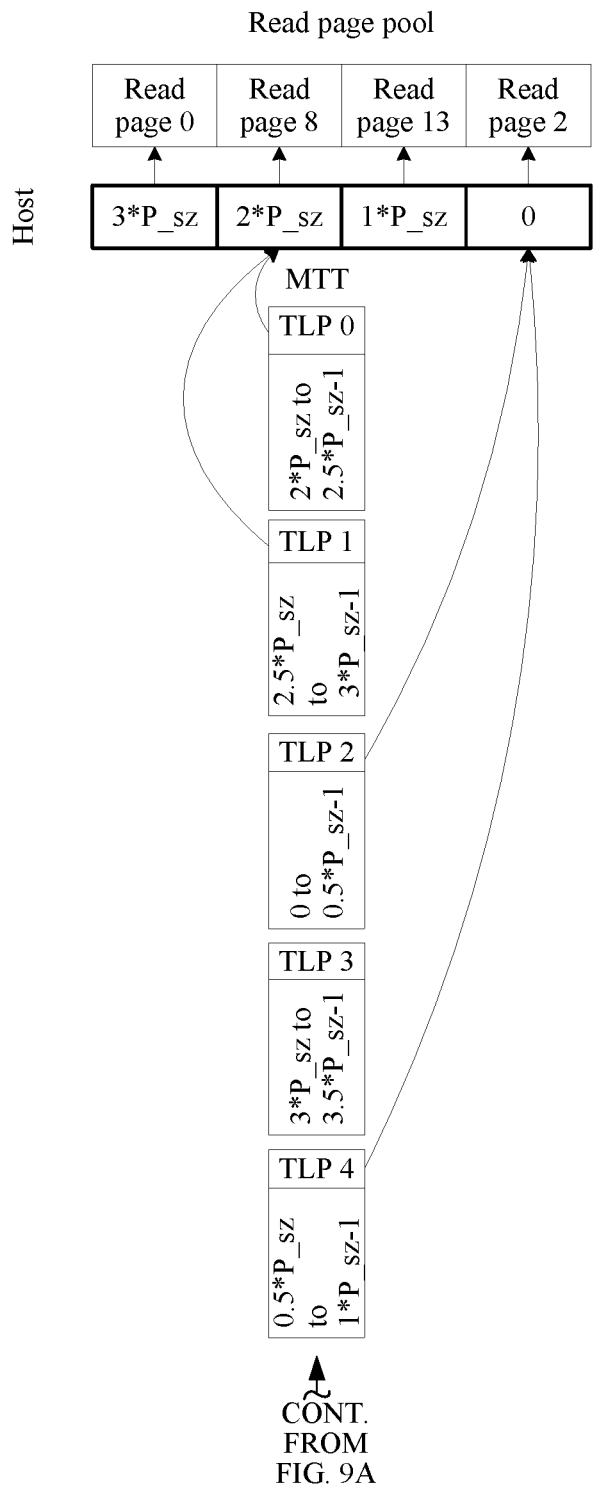

As shown in FIG. 9A and FIG. 9B, a size of to-be-read data is 4*P_sz, where P_sz is a size of a read page, namely, a size of storage space. A size of a read memory block is 2*P_sz. For example, the to-be-read data needs two read memory blocks to perform checking and error correction on data. In this embodiment of the present disclosure, a TLP is used as an example of a data packet for description. A size of payload data of each TLP is 0.5*P_sz. For example, data of each read memory block needs to be sent by using four TLPs. As shown in the figure, an NVMe controller sequentially reads the to-be-read data from a storage medium to a read memory block 0 and a read memory block 1 for checking. The NVMe controller may concurrently check data of two read memory blocks. Because checking speeds of the read memory blocks are different, in this embodiment of the present disclosure, checking of the read memory block 1 is completed before checking of the read memory block 0. The NVMe controller first sequentially encapsulates data in the read memory block 1 into a TLP, and sends the data to a host through a PCIe network. As shown in the figure, data encapsulated in a TLP 0 and a TLP 1 is data of the read memory block 1, and then the checking of the read memory block 0 is completed. The NVMe controller encapsulates the data of the read memory block 0 into the TLP in a data sequence, and sends the data to the host through the PCIe network. As shown in the figure, data encapsulated in a TLP 2, a TLP 4, a TLP 6, and a TLP 7 is data of the read memory block 0. As shown in the figure, in this embodiment, a data packet received by the host may be out of sequence. The host may determine a sequence of payload data in the to-be-read data based on a data offset in a received TLP, and search an MTT based on the sequence of the payload data in the to-be-read data and indication information, to determine an address of a read page for storing the payload data, and write the payload data into a corresponding read page. As shown in the figure, after writing payload data of the TLP 0 and the TLP 1 into a read page 8, the host completes a write operation on the read page 8, and the host may process data in the read page 8. Similarly, after writing payload data of the TLP 2 and the TLP 4 into a read page 2, the host completes a write operation on the read page 2, and the host may process data in the read page 2. In this embodiment of the present disclosure, that the host processes data stored in a read page is further consuming the data, for example, sending the data to another entity, and the host may perform an operation on the to-be-read data, without a need to wait until the to-be-read data is totally written. In this embodiment of the present disclosure, a pipeline processing manner is implemented, thereby shortening a read operation delay.

In this embodiment, after completing processing of a storage unit indicated by a second address, the host may release the storage unit for the use of another read operation. For example, in the embodiment in FIG. 9A and FIG. 9B, after completing processing of the data stored in the read page 8, the host may release the read page 8 to a read page pool for the use of another read operation, and release storage space occupied by the read operation, without a need to wait until the entire read operation is completed and all to-be-read data is processed, thereby reducing occupation of storage space.

After completing a read operation, the NVMe controller is further configured to trigger a completion queue entry (CQE), where the CQE is used to indicate that the NVMe controller has completed the read operation specified by the read instruction, and the host is further configured to obtain the completion queue entry CQE. In this embodiment, the host may obtain the CQE only after performing an operation on data in the storage unit indicated by the second address.

According to the technical solutions disclosed in the embodiments of the present disclosure, the host opens the first address to the NVMe controller as a data portal address, so that the NVMe controller writes the to-be-read data into the host by using the first address. A destination address carried in a data packet from the NVMe controller is the first address. After receiving the data packet, the host does not truly write payload data in the data packet into the storage space indicated by the first address, but maps the first address to the second address, and writes the payload data in the data packet into the storage space indicated by the second address. The storage space indicated by the second address may be private memory space of the host, so that a relationship between the storage space for storing the payload data and a communication protocol is broken, and the host accesses the second address without being restricted by the communication protocol. Before the read instruction is completed, the host may use data stored in the storage space indicated by the second address, and early release the storage space indicated by the second address for the use of another read operation. According to the technical solutions disclosed in the embodiments of the present disclosure, a read operation delay can be shortened and storage space used to store the to-be-read data can be reduced.

Figure 10:
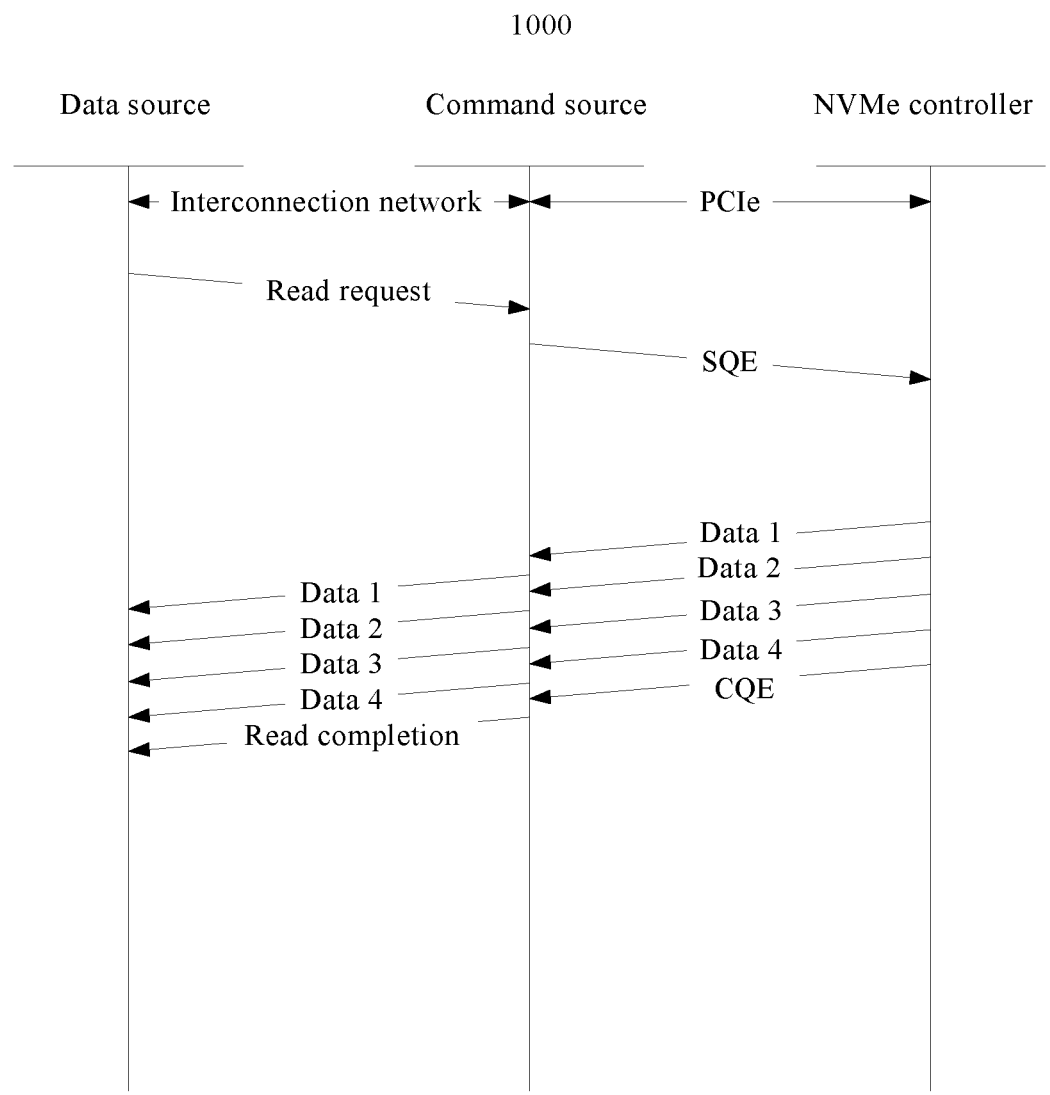
FIG. 10 is a signaling diagram of an NVMe-based data read method according to an embodiment of the present disclosure.

FIG. 10 is an interaction flowchart of an NVMe-based data read method 1000 according to an embodiment of the present disclosure. As shown in FIG. 10, in an application scenario of the method 1000, a data source and a command source are separate. The data source needs to read to-be-read data to storage space of the data source by using the command source. A specific scenario in which the data source and the command source are separate is not limited in this embodiment of the present disclosure.

Figure 11A:
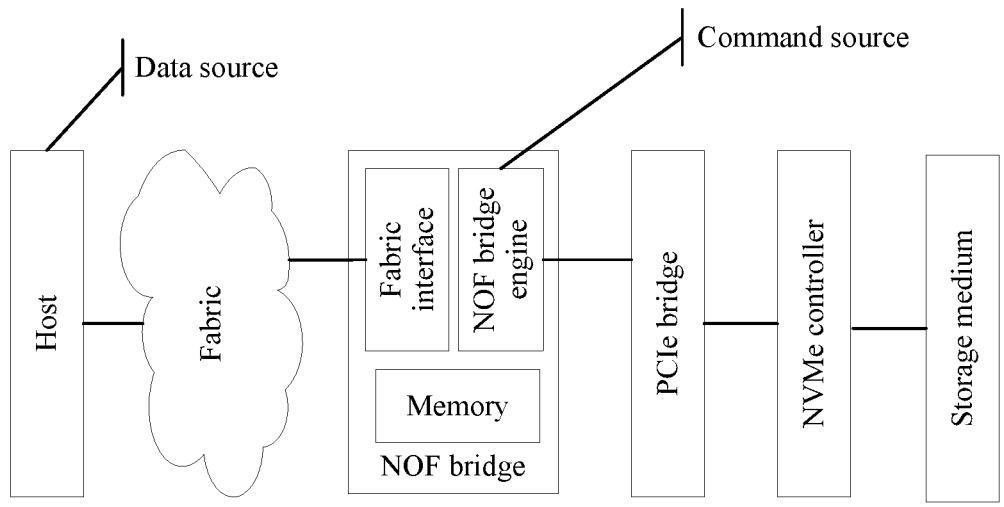
FIG. 11(a) is a schematic diagram of a logical structure of an NVMe system according to an embodiment of this application.

For example, in this embodiment of the present disclosure, a scenario in which the data source and the command source are separate may be a just a bunch of flash (JBOF) based on NOF. As shown in FIG. 11(a), a data source is a host that requires to access a storage medium, and a command source is an NOF bridge coupled to the host by using a fabric. More further, the command source may be an NOF engine in the NOF bridge. The NOF bridge is coupled to an NVMe controller through a PCIe bus, and the NVMe controller is coupled to the storage medium.

Figure 11B:
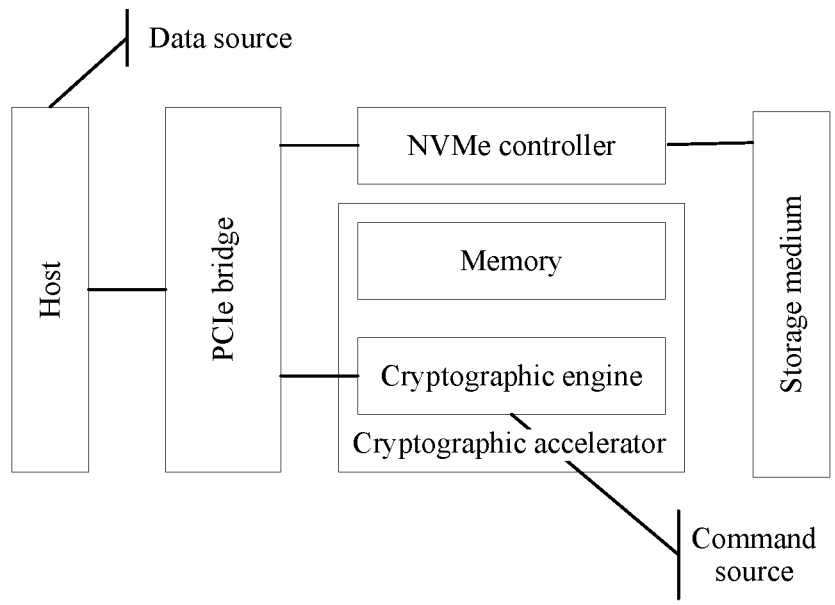
FIG. 11(b) is a schematic diagram of a logical structure of an NVMe system according to an embodiment of this application.

In this embodiment, in a scenario in which the data source and the command source are separate, the data source and the command source may further be a host and a cryptographic accelerator. As shown in FIG. 11(b), the data source is a host, and the command source is a cryptographic accelerator coupled to the host. More further, the command source is an acceleration engine of the cryptographic accelerator. The cryptographic accelerator is coupled to an NVMe controller through a PCIe bus, and the NVMe controller is coupled to a storage medium.

In this embodiment of the present disclosure, when performing a read operation, the command source adds indication information of a portal address of the to-be-read data to an SQE. The portal address may essentially be a segment of a PCIe address that is addressable by the NVMe controller. After obtaining the SQE, the NVMe controller sends a TLP to the command source by performing a PCIe write operation, and adds the PCIe address to the TLP. After receiving the TLP packet, the command source parses the TLP packet to obtain the PCIe address, determines, based on a mapping relationship between the PCIe address and a local memory, a local storage unit corresponding to the PCIe address, and then writes payload data in the TLP into the determined storage unit. One portal may correspond to a plurality of storage units. Once a write operation on the storage unit is completed, the command source may perform an operation on data stored in the storage unit. That the write operation on the storage unit is competed refers to writing payload data of a last TLP corresponding to the storage unit into the storage unit. After obtaining some data of the to-be-read data, the command source may send the obtained data to the data source, and send the to-be-read data to the data source, without a need to wait until an entire read operation is completed. As shown in FIG. 10, the to-be-read data includes data 1, data 2, data 3, and data 4, and each of the data 1, the data 2, the data 3, and the data 4 may correspond to one storage unit. After receiving data of a storage unit, the command source may send the data of the storage unit to the data source. After sending the data of the storage unit to the data source, the command source may release a corresponding storage unit for the use of another read operation.

According to the technical solutions disclosed in the embodiments of the present disclosure, the command source establishes the mapping relationship between the local memory and the PCIe address, and writes payload data in a received TLP into memory space of the command source, so that a pipeline operation on data can be implemented. For example, after receiving some data, the command source may send the received data to the data source, and receiving data from the NVMe controller and sending the data to the data source can be concurrently processed, thereby reducing storage space used to cache data and increasing a processing speed of a read operation.

Figure 12:
FIG. 12 is a schematic diagram of a logical structure of a computing device according to an embodiment of this application.

FIG. 12 is a schematic diagram of a logical structure of a computing device 1200 according to an embodiment of this application. As shown in FIG. 12, the computing device 1200 includes:

a processing unit 1202, configured to trigger a read instruction to an NVMe controller, where the read instruction carries indication information, the indication information is used to indicate a first address, and the first address is an address that is addressable by the NVMe controller; and a receiving unit 1204, configured to receive a first data packet from the NVMe controller, where the first data packet carries the first address and first payload data.

The processing unit 1202 determines a second address based on the first address, and writes the first payload data into a storage unit indicated by the second address. The second address is an address that is addressable by the processing unit 1202.

Optionally, after completing a write operation on the storage unit indicated by the second address, the processing unit 1202 is further configured to perform an operation on data in the storage unit indicated by the second address.

After performing the operation on the data in the storage unit indicated by the second address, the processing unit 1202 is further configured to obtain a completion queue entry CQE triggered by the NVMe controller, where the CQE is used to indicate that the NVMe controller has completed a read operation specified by the read instruction.

After performing the operation on the data in the storage unit indicated by the second address, the processing unit 1202 is further configured to release the storage unit indicated by the second address.

Before triggering the read instruction, the processing unit 1202 is further configured to allocate the storage unit indicated by the second address to the read instruction, and record a correspondence between the first address and the second address.

Optionally, to-be-read data of the read instruction corresponds to at least two data packets, and the processing unit 1202 allocates at least two storage units to the read instruction.

The processing unit 1202 may determine the second address based on the first address and a sequence of the first payload data in the to-be-read data.

Optionally, the receiving unit 1204 is further configured to receive a second data packet from the NVMe controller, where the second data packet carries the first address and second payload data. The processing unit 1202 is further configured to determine a sequence of the first payload data and the second payload data in the to-be-read data based on a sequence of receiving the first data packet and the second data packet.

Optionally, the first data packet further carries an offset of the first payload data in the to-be-read data, and the offset is used to indicate the sequence of the first payload data in the to-be-read data.

In this embodiment of the present disclosure, the first address may be a PCIe address that is addressable by the NVMe controller, the first data packet is a PCIe packet, and the storage unit indicated by the second address may be memory space of the computing device.

In this embodiment of this application, the processing unit 1202 may be further implemented by the read operation logic 310 in the processor 301 in FIG. 3, or by the processor 301 in FIG. 3 and the read operation module 306 in the system memory 302. The receiving unit 1204 may be implemented by the processor 301 and the communications interface 303 in the embodiment in FIG. 3.

This embodiment of this application is an apparatus embodiment of a host corresponding to the foregoing embodiments, and the description of the features in the foregoing embodiments is applicable to this embodiment of this application. Details are not described herein again.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make replacements to some technical features thereof, without departing from the scope of the claims.

What is claimed is:

1. A non-volatile memory express (NVMe)-based data read system, wherein the system comprises:
   a host;
   an NVMe controller; and
   a storage medium;
   wherein the host is configured to:
   use a first address as a data portal address for the NVMe controller; and
   trigger a read instruction, wherein the read instruction carries indication information indicating the first address;

wherein the NVMe controller is configured to:
   obtain the read instruction;
   read, from the storage medium, data corresponding to the read instruction; and
   send a first data packet to the host, wherein the first data packet carries the first address and first payload data, wherein the first address is a destination address of the first data packet, and wherein the data read from the storage medium comprises the first payload data; and wherein the host is further configured to:
   receive the first data packet carrying the first address and the first payload data; and
   without writing the first payload data into a storage space indicated by the first address, determine a second address based on the first address carried in the first data packet, and write the first payload data into a storage space indicated by the second address.

2. The system according to claim 1, wherein the host is further configured to, after completing a write operation on the storage space indicated by the second address, perform an operation on data in the storage space indicated by the second address.

3. The system according to claim 2, wherein the NVMe controller is further configured to trigger a completion queue entry (CQE), wherein the CQE indicates that the NVMe controller has completed a read operation specified by the read instruction; and wherein the host is further configured to, after performing the operation on the data in the storage space indicated by the second address, obtain the CQE.

4. The system according to claim 2, wherein the host is further configured to, after performing the operation on the data in the storage space indicated by the second address, release the storage space indicated by the second address.

5. The system according to claim 1, wherein the host is further configured to, before triggering the read instruction, allocate the storage space indicated by the second address to the read instruction, and record a correspondence between the first address and the second address.

6. The system according to claim 5, wherein the data corresponding to the read instruction corresponds to at least two data packets, and wherein the host is configured to allocate at least two storage units to the read instruction.

7. The system according to claim 6, wherein the host is configured to determine the second address based on the first address and a sequence of the first payload data with respect to the data read from the storage medium.

8. The system according to claim 7, wherein the NVMe controller is further configured to send a second data packet to the host, the second data packet carries the first address and second payload data, and the data read from the storage medium comprises the second payload data; and wherein the host is further configured to:
   receive the second data packet; and
   determine a sequence of the first payload data and the second payload data with respect to the data read from the storage medium based on a sequence of receiving the first data packet and the second data packet.

9. The system according to claim 7, wherein the first data packet further carries an offset of the first payload data with respect to the data, and the offset indicates the sequence of the first payload data with respect to the data read from the storage medium.

10. The system according to claim 1, wherein the first address is a PCIe address, the first data packet is a PCIe packet, and the storage space indicated by the second address is memory space of the host.

11. A non-volatile memory express (NVMe)-based data read method, wherein the method comprises:
   using, by a host, a first address as a data portal address for an NVMe controller;
   triggering, by the host, a read instruction, wherein the read instruction carries indication information indicating the first address;
   receiving, by the host, a first data packet from the NVMe controller, wherein the first data packet carries the first address and first payload data, wherein the first address is a destination address of the first data packet; and
   without writing the first payload data into a storage space indicated by the first address, determining, by the host, a second address based on the first address carried in the first data packet, and writing, by the host, the first payload data into a storage space indicated by the second address.

12. The method according to claim 11, wherein after the host completes a write operation on the storage space indicated by the second address, the method further comprises:
   performing, by the host, an operation on data in the storage space indicated by the second address.

13. The method according to claim 12, wherein after the host performs the operation on the data in the storage space indicated by the second address, the method further comprises:
   obtaining, by the host, a completion queue entry (CQE) triggered by the NVMe controller, wherein the CQE indicates that the NVMe controller has completed a read operation specified by the read instruction.

14. The method according to claim 12, wherein after the host performs the operation on the data in the storage space indicated by the second address, the method further comprises:
   releasing, by the host, the storage space indicated by the second address.

15. The method according to claim 11, wherein before the host triggers the read instruction, the method further comprises:
   allocating, by the host, the storage space indicated by the second address to the read instruction, and recording a correspondence between the first address and the second address.

16. The method according to claim 15, wherein to-be-read data corresponding to the read instruction corresponds to at least two data packets, and the host allocates at least two storage units to the read instruction.

17. The method according to claim 16, wherein the host determines the second address based on the first address and a sequence of the first payload data with respect to the to-be-read data.

18. The method according to claim 11, wherein the first address is a PCIe address, the first data packet is a PCIe packet, and the storage space indicated by the second address is memory space of the host.

19. A host, comprising:
   a processor;
   a memory configured to store instructions; and
   a bus, wherein the processor and the memory are coupled through the bus; and
   wherein the processor is configured to execute the instructions stored in the memory to facilitate the following being performed by the host:
   using a first address as a data portal address for a non-volatile memory express (NVMe) controller;
   triggering a read instruction, wherein the read instruction carries indication information indicating the first address;
   receiving a first data packet from the NVMe controller, wherein the first data packet carries the first address and first payload data, wherein the first address is a destination address of the first data packet; and
   without writing the first payload data into a storage space indicated by the first address, determining a second address based on the first address carried in the first data packet, and writing the first payload data into a storage space indicated by the second address.

* * * * *